(12) United States Patent
Krasnoff (10) Patent No.: US 12,418,609 B2
(45) Date of Patent: Sep. 16, 2025

(54) MOBILE DEVICE ACCESSORY

(71) Applicant: DUPLICENT, LLC, Santa Monica, CA (US)

(72) Inventor: Curren Emmett Krasnoff, Santa Monica, CA (US)

(73) Assignee: Duplicent, LLC, Santa Monica, CA (US)

( * ) Notice: Subject to any disclaimer, the term of this patent is extended or adjusted under 35 U.S.C. 154(b) by 421 days.

(21) Appl. No.: 17/897,072

(22) Filed: Aug. 26, 2022

(65) Prior Publication Data

US 2023/0300232 A1    Sep. 21, 2023

Related U.S. Application Data

(63) Continuation of application No. PCT/US2021/024857, filed on Mar. 31, 2021.

(60) Provisional application No. 63/002,754, filed on Mar. 31, 2020.

(51) Int. Cl.
*H04M 1/72409*  (2021.01)
*G06F 3/02*  (2006.01)
*G06F 3/0354*  (2013.01)
*H04M 1/02*  (2006.01)

(52) U.S. Cl.
CPC ...... *H04M 1/72409* (2021.01); *G06F 3/0221* (2013.01); *G06F 3/03547* (2013.01); *H04M 1/0262* (2013.01); *H04M 1/0274* (2013.01)

(58) Field of Classification Search
CPC ............. H04M 1/0274; H04M 1/0262; H04M 1/72409; G06F 3/0221; G06F 3/03547
See application file for complete search history.

(56) References Cited

U.S. PATENT DOCUMENTS

| | | | |
|---|---|---|---|
| 5,995,025 A | 11/1999 | Sternglass et al. | |
| 7,540,675 B2 | 6/2009 | Liu | |
| 2003/0048595 A1* | 3/2003 | Hsieh | G06F 3/0221 |
| | | | 361/679.16 |
| 2004/0033096 A1* | 2/2004 | Choi | H01H 13/86 |
| | | | 400/472 |

(Continued)

OTHER PUBLICATIONS

International Preliminary Report on Patentability in International Appln. No. PCT/US2021/024857, mailed on Oct. 13, 2022, 8 pages.

(Continued)

*Primary Examiner* — Jinsong Hu
*Assistant Examiner* — Farideh Madani
(74) *Attorney, Agent, or Firm* — Fish & Richardson P.C.

(57) ABSTRACT

An accessory case for a mobile device includes a housing, a channel, and an input board. The housing has a base wall and a perimeter wall extending away from the base wall, which together define a cavity to receive a mobile device. The channel is formed within the base wall, and extends inward from but not through the base wall to define a pocket that is separate from the cavity. The input board is received within the pocket. The input board is formed by folded segments that have one or more inputs. The input board is configured to transition between a folded position and an unfolded position. In the folded position, a width of the input board is less than a width of the channel. In the unfolded position, the width of the input board is greater than the width of the channel.

9 Claims, 5 Drawing Sheets

(56) References Cited

U.S. PATENT DOCUMENTS

| | | | | |
|---|---|---|---|---|
| 2004/0195305 A1* | 10/2004 | Dotson | ................. | H01H 13/86 |
| | | | | 235/145 R |
| 2005/0146446 A1 | 7/2005 | Hsu | | |
| 2005/0164752 A1* | 7/2005 | Lau | .................... | H04M 1/0247 |
| | | | | 455/575.1 |
| 2018/0196477 A1* | 7/2018 | Murphy | ................ | G06F 1/1669 |
| 2020/0026363 A1* | 1/2020 | Wei | ....................... | G06F 1/1654 |

OTHER PUBLICATIONS

International Search Report and Written Opinion in International Appln. No. PCT/US2021/024857, mailed on Aug. 12, 2021, 14 pages.

* cited by examiner

MOBILE DEVICE ACCESSORY

CROSS-REFERENCE TO RELATED PATENT APPLICATIONS

This application is a continuation of International Patent Application No. PCT/US2021/024857, filed Mar. 31, 2021, which claims the benefit of and priority to U.S. Provisional Patent Application No. 63/002,754, filed Mar. 31, 2020, the content of which is hereby incorporated by reference in its entirety.

BACKGROUND

Phones and other mobile devices are frequently used to input and send messages, notes, and other media to different devices on a network. Although convenient, mobile devices typically lack inputs that enable efficient and fast data input. Further, because data input can be inefficient, mobile devices frequently do not contain certain software classes (e.g., word processing programs, spreadsheets, etc.) that are often found on traditional computers.

SUMMARY

One exemplary embodiment relates to an accessory case for a mobile device. The accessory case includes a housing, a channel, and an input board. The housing has a base wall and a perimeter wall extending away from the base wall. The perimeter wall and the base wall together define a cavity to receive a mobile device. The channel is formed within the base wall. The channel is defined by walls that extend inward from a first perimeter side of the base wall, toward but not through a second perimeter side of the base wall. The channel defines a pocket within the base wall that is separated from the cavity. The input board is received within the pocket. The input board is formed by several folded segments that support several inputs. The input board is configured to transition between a folded position and an unfolded position. In the folded position, a width of the input board is less than a width of the channel. In the unfolded position, the width of the input board is greater than the width of the channel.

Another exemplary embodiment relates to a mobile device. The mobile device includes a cover, a display, and an input board. The cover is formed from a substantially flat rear wall and a side wall extending upwardly away from the rear wall. The side wall extends at least partially around the rear wall. The rear wall and the side wall together define a cavity that receives a rechargeable battery. The display extends across a portion of the cover to enclose the rechargeable battery. The display is configured to present a graphical user interface that is powered by the rechargeable battery. The input board is coupled to the cover and extends within a recess formed within and along at least a portion of the rear wall. The input board is formed by several folded segments having inputs that are configured to interact with the graphical user interface. The input board is configured to transition between a folded position and an unfolded position. In the folded position, the input board is received entirely within the recess so that the entire keyboard is positioned inward from an outermost surface of the rear wall. In the unfolded position, the input board is removed from the recess and is defined by a width that is greater than a width of the cover.

Another exemplary embodiment relates to a mobile device. The mobile device includes a cover, a display, and an input board. The cover is formed from a substantially flat rear wall and a side wall that extends upwardly away from the rear wall. The side wall extends at least partially around the rear wall. The rear wall and side wall together define a cavity that receives a rechargeable battery. The display extends across a portion of the cover to enclose the rechargeable battery. The display is configured to present a graphical user interface that is powered by the rechargeable battery. The input board is coupled to the cover and extends within a recess formed within and along at least a portion of the rear wall. The input board is formed from several folded segments that support inputs that are configured to interact with the graphical user interface. The input board is configured to transition between a folded position and an unfolded position. In the folded position, the input board is defined by a width that is less than a length of the rear wall. In the unfolded position, the input board is defined by a width at least 50 percent larger than the length of the rear wall.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to keyboard and/or input systems and apparatuses that can be used with a mobile device and/or a mobile device case. Specifically, the mobile devices are equipped with a thin, full keyboard or input board that can be selectively deployed to improve the functionality of a standard phone or mobile device. The keyboard can be folded and stored in a compact shape along or within the mobile device case, which allows the keyboard to be easily transported with the mobile device. If a user wishes to access the keyboard, the keyboard can be released or otherwise removed from within the mobile device case. Once partially extended from the mobile device case, the keyboard can be unfolded to reveal a full keyboard that can then be used to input text into the mobile device. The keyboard can further include a mounting tab that can be folded to prop the mobile device and mobile device case in an orientation that is conducive to typing with the keyboard. By providing a full keyboard, various different programs (e.g., word processing programs, emails, etc.) that might normally be reserved for traditional computers or laptops can be effectively used with a standard mobile device (e.g., a smart cellular phone). Similarly, the speed with which a user can enter information is improved relative to conventional mobile devices.

Figure 1:
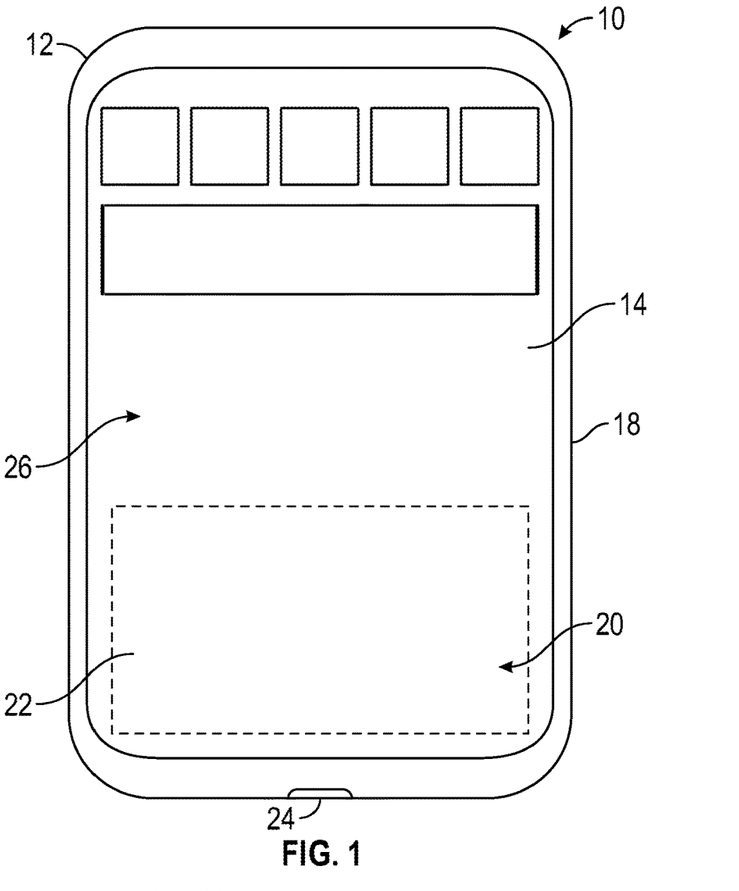
FIG. 1 is a front view of a mobile device within a case, according to an exemplary embodiment.

As shown in FIG. 1, a mobile device 10 is depicted. The mobile device 10, which is depicted as a smart cellular phone, can take several different forms, including a tablet, computer, smart watch, laptop, etc. that is configured to be transported to various locations. The mobile device 10 can be configured to communicate over various different communication frequencies, including cellular, Wi-Fi, Bluetooth, and the like. Similarly, the mobile device 10 can be configured to support one or more of video calls, voice calls, text messaging (SMS), internet messaging, and/or e-mail, for example, which can be communicated over and through various different networks.

Figure 2:
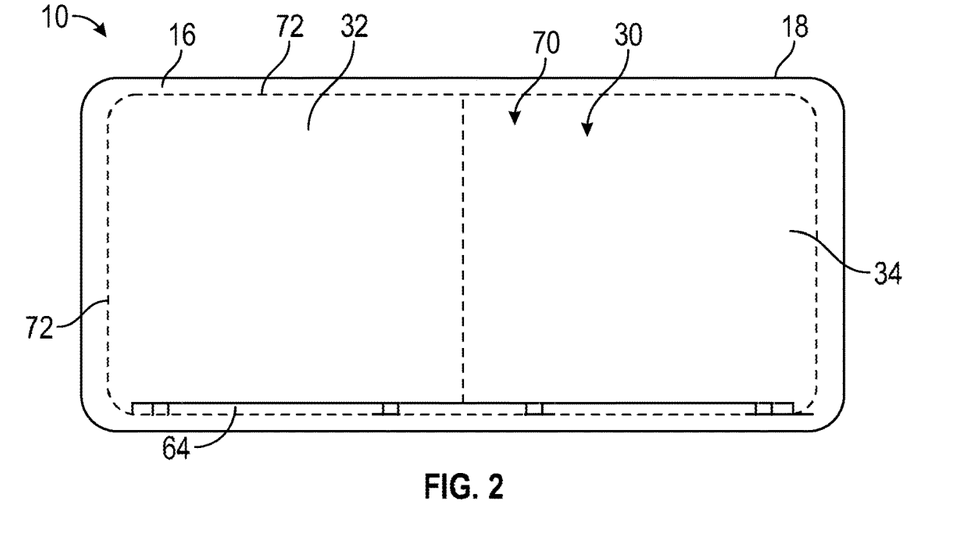
FIG. 2 is a rear view of the mobile device of FIG. 1, depicting an accessory in a first configuration.

With additional reference to FIG. 2, the mobile device 10 generally includes an outer shell or structure that is formed from a cover 12 and a display 14. The cover 12 is formed from a substantially flat rear wall 16 and a side wall 18 that extends at least partially around the rear wall 16. The offset between the top of the side wall 18 and an inner surface of the rear wall 16 together define a cavity 20. The cavity 20 receives the various different electronic components that power the mobile device, including for example a rechargeable battery 22, an antenna (not shown), and one or more processors, transistors, chips, and semi-conductors. In some examples, the rechargeable battery 22 is completely enclosed within the cover 12 and display 14 so that the rechargeable battery 22 is protected from external contaminants (e.g., moisture, dust, etc.). In some examples, one or more terminals 24 are formed within or through the cover 12 to form externally accessible connections that can be used to transmit and/or receive electrical power between the rechargeable battery 22 and an external power source (e.g., a wall charger) or consumption device (e.g., an accessory, as explained in additional detail below).

The display 14 is coupled to the cover 12, and is configured to present a wide variety of data to a user through a graphical user interface (GUI) 26. The GUI 26 can be configured to present messages, word processing programs, articles, spreadsheets, games, and other interactive items that can be adjusted or otherwise interacted with using a variety of inputs on the mobile device 10. The inputs can be presented as part of the GUI 26, in a touch screen, or can be physical buttons presented on and supported by the cover 12 and/or the display 14. In some examples, the inputs are a series of alphanumeric keys that can be used to type different messages into the GUI 26. Various other types of inputs can be formed within the cover 12 and/or display 14, including power toggle switches, volume adjustments, and the like. In some examples, the various inputs include both physical actuators and touch screen actuators, both of which are configured to interact with the GUI 26 on the display 14. The display 14 can be a liquid crystal display (LCD), light emitting diode (LED) display, or other similar suitable type of solid state light source display, for example. As discussed above, the display 14 can be powered by the rechargeable battery 22.

Although convenient, the size and location of the various inputs on the cover 12 and/or display 14 may negatively impact the speed and accuracy with which a user can create and relay messages. For example, the narrow spacing between inputs on a touch screen may result in frequent typographical errors and accidental inputs that are preferably avoided. Similarly, the spacing between the inputs significantly hampers the speed at which a user can enter information, as typically only one or two fingers can be used at a time to interact with different inputs. These data entry difficulties caused by space constraints are such that conventional mobile devices 10 often omit word processing programs and other frequently used software.

To address the data entry issues, the mobile device 10 includes an accessory, shown as input board 30. The input board 30 is formed of a series of folded segments that support different inputs (e.g., keys, buttons, trackpads, etc.) that can be used to input data into the mobile device 10. The folded segments are configured to selectively deploy to transition the input board 30 between a folded position (e.g., the position shown in FIGS. 2-3) and an unfolded position (e.g., the position shown in FIGS. 4 and 6). The input board 30 is configured to provide a faster and more efficient mechanism for data entry than the other inputs positioned on either of the cover 12 or the display 14.

Figure 4:
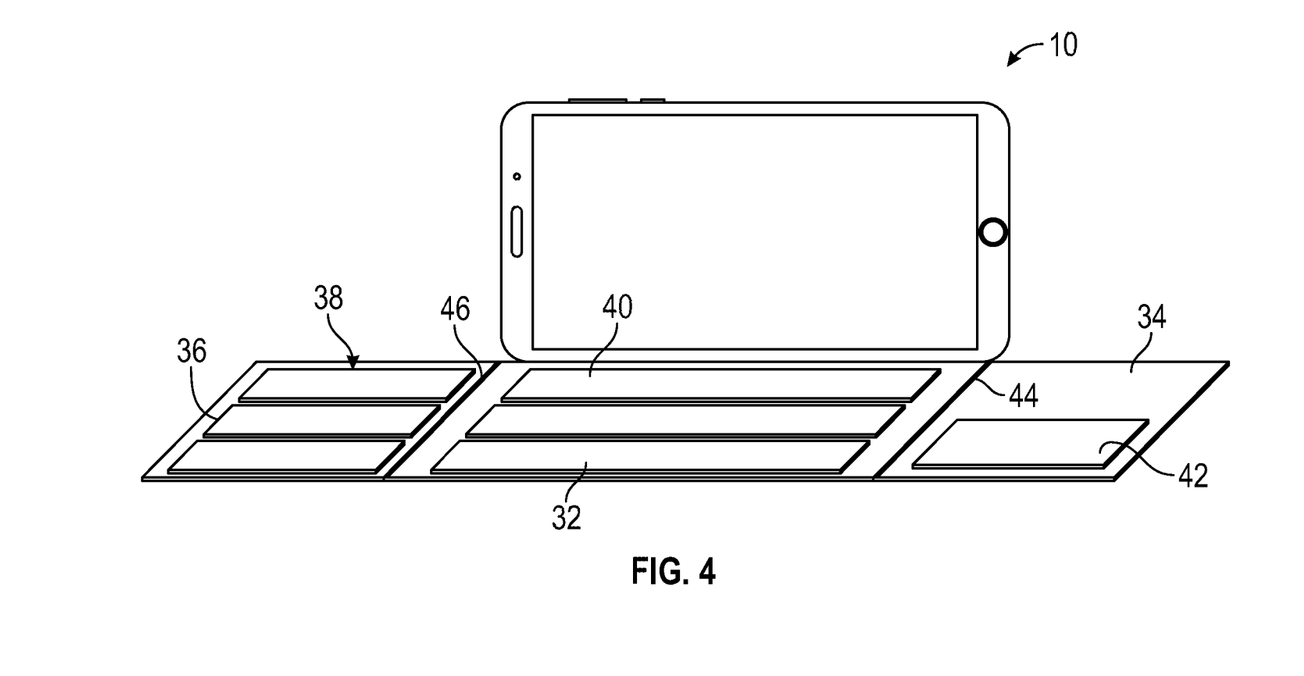
FIG. 4 is a perspective view of the mobile device of FIG. 1, depicting the accessory of FIG. 2 in a third configuration.
Figure 6:
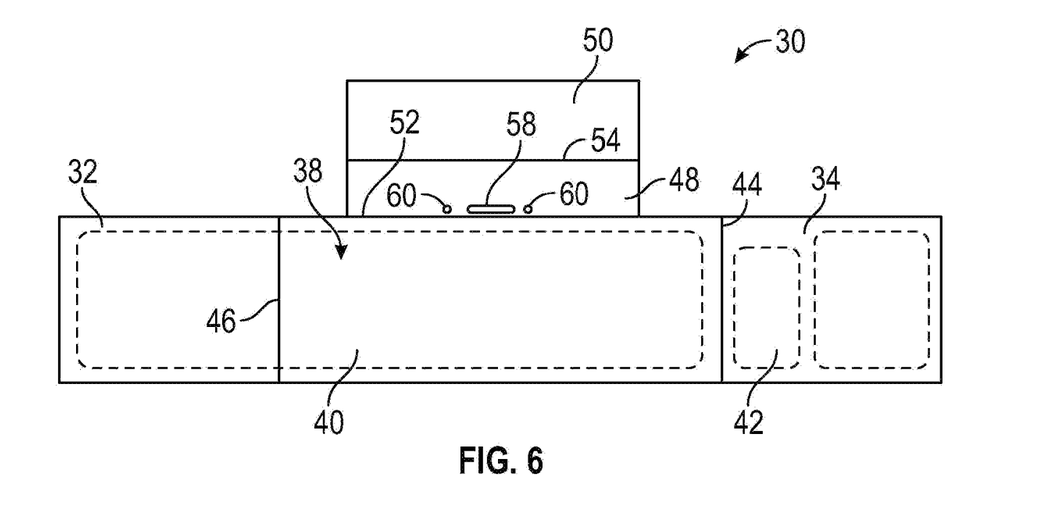
FIG. 6 is a top view of the accessory in a fully unfolded position, depicting the hinge lines in the accessory.

With specific reference to FIGS. 4 and 6, the input board 30 is shown in additional detail. The input board 30 is generally formed from a first, main panel section 32, a second panel section 34, and a third panel section 36 that support a variety of inputs 38. The variety of inputs 38 can include alphanumeric keys 40 and one or more track pads 42, for example, that are spaced about the first panel section 32, second panel section 34, and third panel section 36, respectively. In some examples, the keys 40 can be electronic and programmable. The keys 40 may be spring actuated, such that the individual keys 40 compress vertically into the input board 30 when pressed, and return to their level position when not pressed. In some examples, the keys 40 each extend upward from the panel sections 32, 34, 36 by a distance that is greater than a thickness of the panel sections 32, 34, 36. In still other examples, the keys 40 are touch or pressure sensitive, and do not move when pressed. The input board 30 can include backlighting, as well as other control keys, such as volume control, power control, and the like.

The track pad 42 can be pressure and/or touch sensitive, and can be formed as a rectangle or square area. In some examples, the track pad 42 can be depressed to make selections on the mobile device 10 as well. Although shown on a right side of the input board 30 in FIG. 6, the track pad 42 can also be positioned at or near the bottom center of the first panel section 32 as well. The track pad 42 can also be formed at or near an edge of one of the panel sections 32, 34, 36, and one of the panel sections 32, 34, 36 contains all of the alphanumeric keys 40. In some examples, the track pad 42 extends across multiple panel sections 32, 34, 36. In some examples, the track pad 42 includes selection buttons that operate similar to a standard mouse. The selection buttons can be positioned along a bottom or top of the track pad 42, for example. In still other examples, the track pad 42 can include a touch sensitive button or ball. The input board 30 can be formed from a flexible polymeric material, for example, that can be pliable to bend when being manipulated or moved from the case 110 or cover 12.

The input board 30 is designed to be compact and easily storable within either the cover 12 or a case 110 of the mobile device 10. To easily store the input board 30, the panels 32, 34, 36 that form the input board 30 are arranged to fold. As depicted in FIG. 4, for example, the first panel section 32 is connected to the second panel section 34 and the third panel section 36 along fold lines 44, 46. In some examples, the first and second fold lines 44, 46 extend approximately parallel (e.g., +/−15 degrees) of each other. The second panel section 34 and third panel section 36 are configured to fold relative to the first panel section 32 about the first and second fold lines 44, 46, which in turn transitions the input board 30 between the folded, storage position and the unfolded, deployed position for use. In some examples, the fold lines 44, 46 do not include any inputs (e.g., keys 40 or trackpads 42). The fold lines can be formed of flexible materials, while the panels 32, 34, 36 can be formed of a more solid material. In still other embodiments, the input board 30 includes hinges along the fold lines 44, 46 to help promote the movement of the second panel section 34 and third panel section 36 relative to the first panel section 32 along the fold lines 44, 46.

Figure 3:
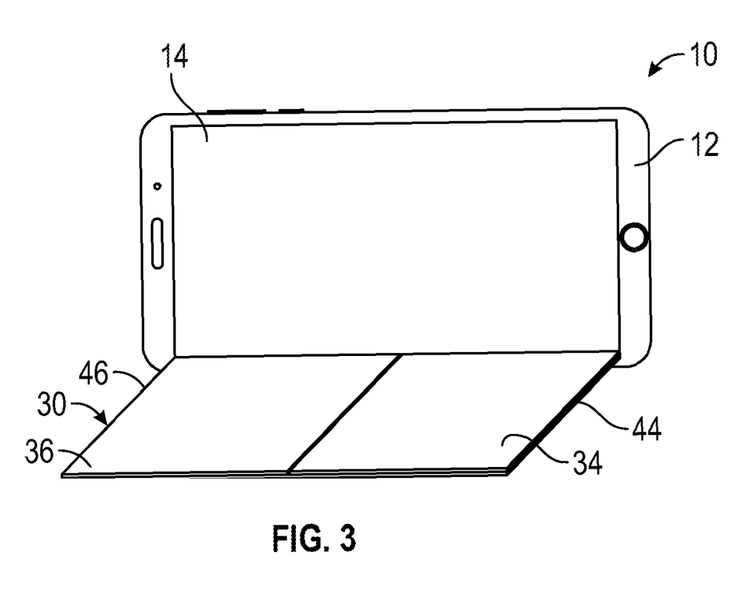
FIG. 3 is a perspective view of the mobile device of FIG. 1, depicting the accessory of FIG. 2 in a second configuration.

In the folded position, the second panel section 34 and third panel section 36 extend along a front surface of the first panel section 32, as depicted in FIG. 3. In some examples, the second panel section 34 and the third panel section 36 are each configured to be about half the size of the first panel section 32. Accordingly, when the second panel section 34 and the third panel section 36 are folded inward, into the storage position, the outer perimeter of the input board 30 is approximately the same size as the outer perimeter of the first panel section 32. Various other folding configurations for the input board 30 can be used as well. For example, the second panel section 34 and third panel section 36 can each be designed to have approximately the same width as the first panel section 32. Similarly, the folding sequence of the input board 30 panel sections 32, 34, 36 can be interchangeable or otherwise chosen to promote a distinct and consistent folding pattern. The panel sections 32, 34, 36 can be adjusted and sized to make the folding sequence intuitive and readily apparent to a user. Differently sized hinges can be used based upon the fold types and patterns used by the input board 30. In some examples, the input board 30 includes one or more magnets that are configured to secure the folded panel sections 32, 34, 36 in place. In still other examples, mechanical or electro-mechanical locks can be used to selectively secure the panel sections 32, 34, 36 in the folded orientation.

In some examples, and as depicted in FIG. 6, the input board 30 includes additional mounting panel sections that can be folded to prop up the mobile device 10 for use with the input board 30. For example, the input board 30 can include a fourth panel section 48 and a fifth panel section 50. In some examples, neither of the fourth panel section 48 or the fifth panel section 50 include inputs. The fourth panel section 48 and fifth panel section 50 extend upwardly away from a top side of the first panel section 32. The fourth panel section 48 is connected to the first panel section 32 along a third fold line 52. The third fold line 52 extends collinear with a top edge of the first panel section 32, approximately perpendicular (e.g., +/−15 degrees) to the first fold line and second fold line 44, 46. The fifth panel section 50 is connected to the fourth panel section 48 along a fourth fold line 54. The fourth fold line 54 extends approximately parallel to the third fold line 52 and approximately perpendicular to the first fold line 44 and the second fold line 46. As depicted in FIG. 6, the fourth panel section 48 and the fifth panel section 50 together are defined by a width that is approximately equal to the width of the first panel section 32. In some examples, the fifth panel section 50 is defined by a width that is different than a width of the fourth panel section 48. For example, and as shown in FIG. 6, the width of the fifth panel section 50 can be larger than the width of the fourth panel section 48. In the folded position, the fourth panel section 48 and the fifth panel section 50 are folded backward, and extend along a rear surface of the first panel section 32. Accordingly, when the input board 30 is in the fully folded position, the input board is arranged in three stacked layers, the lowermost of which is the fourth panel section 48 and the fifth panel section 50. The first panel section 32 forms the middle layer. The second panel section 34 and third panel section 36 form the top layer of the input board 30. In some examples, each of the panel sections 32, 34, 36, 48, 50 is defined by a thickness that is less than ⅓ of the thickness of a thickness defining the mobile device 10. The thickness of the panel sections 32, 34, 36, 48, 50 can be less than ¼, less than ⅙, less than ⅛, less than ​1/10, less than ​1/20, less than ​1/30, or less than ​1/40 of the thickness of the mobile device 10, for example. In still other examples, the panel sections 32, 34, 36 are separate panels that can be arranged into the full input board 30 once removed from the cover 12 or case 110.

The input board 30 is configured to be deployed for use with the mobile device 10. To deploy the input board 30, the input board 30 must first be removed from its storage position on or along the mobile device 10. As will be explained in additional detail below, the input board 30 can be stored within or along the cover 12 of the mobile device 10 or can be positioned or otherwise received within a protective case 110 that is received around the mobile device 10. The input board 30 can be fully removable and detachable from the mobile device 10 and/or case 110, or can be hingedly or otherwise coupled to the mobile device 10 and/or case 110 so that the deployment process begins by rotating the input board 30 relative to the mobile device 10.

Upon removing the input board 30 from the storage position on or along the mobile device 10 or case 110, the input board 30 can first be activated or otherwise provided with electrical power. In some examples, the input board 30 has its own onboard power source (e.g., batteries, etc.). Once removed from storage, the input board 30 can be powered on using a switch or by pressing an input on the input board 30, for example.

In some examples, the input board 30 is configured to draw electrical power from the rechargeable battery 22 within the mobile device 10. Accordingly, the input board 30 and cover 12 (or case 110) can include externally accessible terminals 56. The externally accessible terminals 56 can extend through the cover 12 or case 110 to provide a selective coupling location for the input board 30. Likewise, one or more of the panel sections of the input board 30 can support both data terminals 58 and power terminals 60. The data terminals 58 and power terminals 60 are configured to be placed into contact with the externally accessible terminals 56 to create an electrical connection between the input board 30 and the mobile device 10. Electrical power from the rechargeable battery 22 can be transmitted through the power terminals 60, while uni-directional or bi-directional communication can occur between the input board 30 and the mobile device over the data terminals 58. The data terminals 58 can be configured to transmit signals that correspond with the detected selections (e.g., the inputs pressed or otherwise actuated) made by a user. Accordingly, inputs selected on one or more of the panel sections of the input board 30 can be communicated to the mobile device 10, where these selections can be used to interact with or otherwise manipulate the GUI 26 on the display 14. In some examples, the data terminals 58 and the power terminals are positioned in a cluster along the first panel section 32. Alternatively, the data terminals 58 and the power terminals 60 can be supported by the fifth panel section 50. In still other examples, power terminals 60 are positioned on the first panel section 32 while the data terminals are positioned on the fifth panel section 50. When the terminals 58, 60 are positioned on different panel sections (or depending on the location where the input board 30 is stored), the terminals 58, 60 may be automatically disconnected from the externally accessible terminals 56 whenever the input board 30 is in the fully folded position or whenever the input board 30 is in the storage position within the cover 12 or the case 110. In still other examples, the input board 30 and the mobile phone 10 have a constant wired connection that is uninterrupted regardless of the position of the input board 30 relative to the mobile phone 10.

The input board 30 can be deployed by first creating a coupling between the terminals 56 upon the mobile device 10 and/or case 110 and the terminals 58, 60, then unfolding the different panel sections of the input board 30. For example, and as depicted in FIG. 3, the mobile device 10 is coupled to the at least partially folded input board 30. In some examples, one or more of the panel sections can include magnets (not shown) that help guide the terminals 56 into contact with the terminals 58, 60 to create the electrical connections that allow the input board 30 to operate. In some examples, and explained in additional detail below, the coupling formed between the input board 30 and the mobile device 10 is not readily removable, and the input board 30 remains hinged to the mobile device 10 when in both the storage position and the deployed position. Accordingly, a wired connection can be maintained between the input board 30 and the mobile device 10 at all times.

With the electric coupling established between the terminals 58, 60 and the externally accessible terminals 56, the input board 30 can be unfolded. In some examples, the input board 30 is first rotated about an axis that is at least partially defined by an outer surface of the cover 12 or an outer surface of the case 110. In other examples, the input board 30 rotates about an axis defined by a hinge that is positioned within or upon the cover 12 of the mobile device 10. As depicted in FIG. 3, the input board 30 can rotate to a position where the input board 30 and the display 14 of the mobile device 10 form an obtuse angle, as depicted in FIG. 5.

With the input board 30 and mobile device 10 positioned, the remaining portions of the input board 30 can be unfolded. As depicted in FIGS. 3 and 4, the second panel section 34 and third panel section 36 can each be unfolded from their respective resting positions along the first panel section 32. The second panel section 34 can be rotated outwardly about the first fold line 44, until the second panel section 34 extends approximately parallel and coplanar with the first panel section 32. Similarly, the third panel section 36 can be rotated outwardly about the second fold line 46, until the third panel section 36 extends approximately parallel and coplanar with the first panel section 32. With both the second panel section 34 and third panel sections 36 extending away from the first panel section 32 to provide a full array of alphanumeric inputs 40 and one or more trackpads 42. Although described as including three panel sections 32, 34, 36 supporting inputs, various embodiments of the input board 30 can include two or less panel sections or four or more foldable panel sections.

Figure 5:
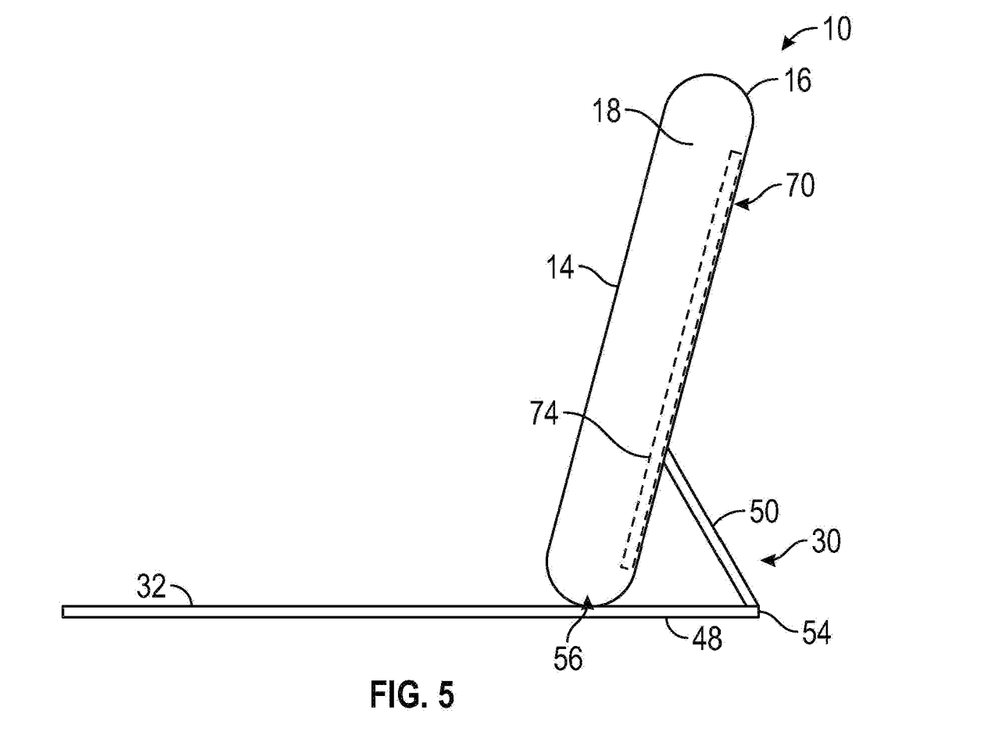
FIG. 5 is a side view of the mobile device of FIG. 1, depicting a mobile device stand that can be formed in the accessory.

In some examples, the input board 30 is configured to prop up or support the mobile device 10, as depicted in FIG. 5. The fourth panel section 48 and the fifth panel section 50 together define a mounting structure that can interact with one of the cover 12 or the case 110 to form a rear support for the mobile device 10. In some examples, the fourth panel section 48 is configured to remain approximately coplanar with the first panel section 32, while the fifth panel section 50 is folded along the fourth fold line 54. The fifth panel section 50 extends upwardly and inwardly away from the fourth panel section 48 and/or the first panel section 32 to form an acute angle between the fifth panel section 50 and a rear surface of the cover 12 or case 110 of the mobile device 10. In some examples, a notch or groove is formed within the rear surface of the cover 12 or case 110 to catch and secure the fifth panel section 50, which can then create a readily adjustable releasable coupling between the input board 30 and the mobile device 10. In some examples, a series of notches are formed within the rear surface of the cover 12 or case 110 so as to allow the fifth panel section 50 to be repositioned relative to the mobile device 10, which in turn adjusts the angle of the mobile device 10 (and display 14) relative to the first panel section 32 and other inputs on the input board 30.

Figure 7:
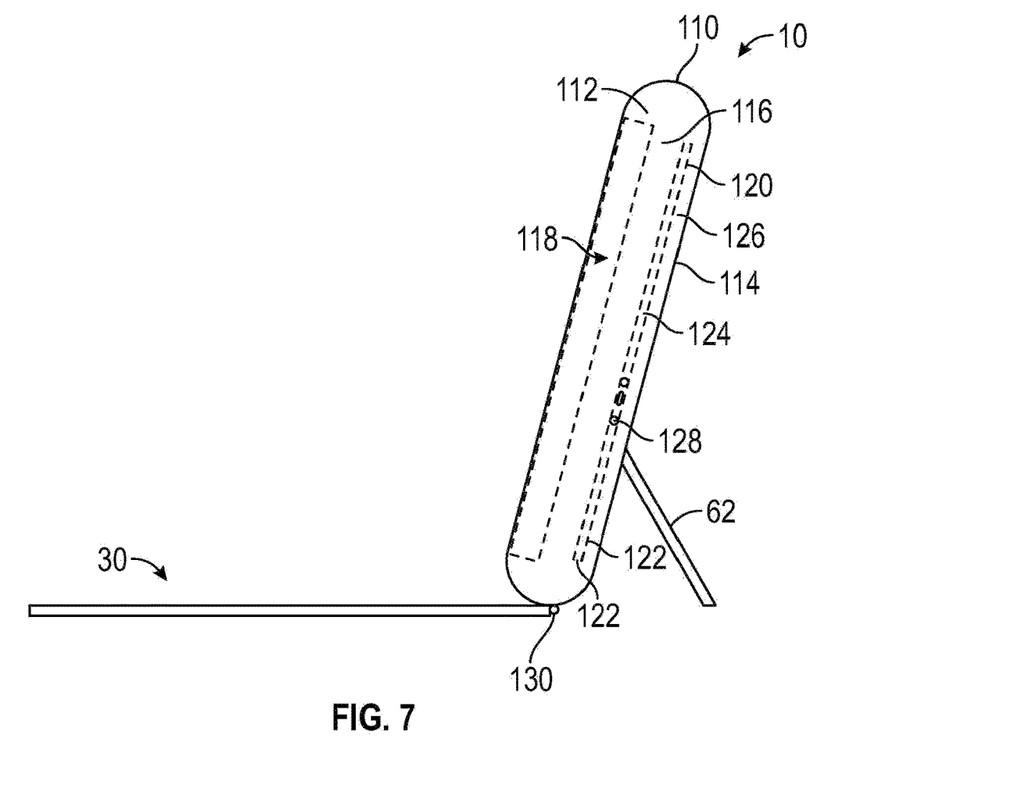
FIG. 7 is a side view of the mobile device of FIG. 1, depicting an alternative device stand positioned on the case.

Alternatively, one or more stands 62 coupled to the cover 12 or the case 110 can be used to support the mobile device 10 for use with the input board 30. As depicted in FIG. 7, a stand 62 extends downwardly and outwardly away from a rear surface of the case 110. In some examples, the stands 62 are hingedly coupled to the mobile device 10 or case 110. The stands 62 can be manually rotated outward, away from the mobile device 10 to a variety of different positions. In some examples, a hinge (not shown) supporting each stand 62 is configured to adjust an angle of the mobile device 10 relative to a surface below. For example, the mobile device 10 can be rotated between an angle of between about 95 degrees and about 175 degrees relative to the ground surface below. In some examples, the stand 62 is formed as a part of a push release mechanism, such that pushing downward (e.g., inward) on one side of the stand 62 causes the stand 62 to release and extend outward from the mobile device 10 or case 110, where it can then be readily manipulated and rotated by a user to adjust the mobile device 10 to a desired orientation. The stand 62 can operate independently of the input board 30, such that the stand 62 can be deployed regardless of the location of the input board 30. In other examples, the stand 62 is configured to automatically deploy upon removal or deployment of the input board 30. In still other examples, the one or more stands 62 are positioned within the base wall 114 and can be accessed and deployed once the input board 30 has been rotated out of the storage position.

In still other examples, the coupling between the input board 30 and the mobile device 10 can be used to prop up or support the mobile device 10 at an angle relative to the surface below and at a preferred or desired angle relative to the input board 30. The input board 30 can be coupled to the mobile device 10 and/or the case 110 using a hinge 64. The hinge 64 can be formed within a pocket or recess formed within a rear wall of the cover 12 or case 110. In some examples, the hinge extends along a full width of the first panel section 32. The hinge 64 can be configured to resist but not prohibit relative motion between the input board 30 and the mobile device 10. In some examples, the resistance within the hinge 64 can be used to position the mobile device 10 relative to the input board 30. Accordingly, a user can adjust the angle between the input board 30 and the mobile device 10 by moving one or both of the input board 30 and mobile device 10 about an axis defined by the hinge 64. The angle between the input board 30 and the mobile device 10 can be adjusted over a range of about 270 degrees, between a position where the input board 30 is stowed alongside the cover 12 or case 110 and a position where the input board 30 is deployed and the angle between the input board 30 and the mobile device 10 is about 90 degrees. The range of motion can be adjusted depending upon the storage position of the input board 30. In some examples, the hinge 64 includes a lock that is configured to secure a relative position of the input board 30 and mobile device 10. The lock on the hinge 64 can secure the input board 30 and mobile device 10 in several discrete and predetermined orientations. In some examples, the input board 30 includes one or more weights positioned at distal ends of the panel sections 32, 34, 36 to operate as counterweights that oppose tipping of the mobile device 10.

As discussed above, the input board 30 can be stored relative to the mobile device 10 in a variety of different locations. For example, the input board 30 can be stored within the cover 12 of the mobile device 10. To promote easy storage and access, a recess 70 is formed within the back side of the rear wall 16. As depicted in FIG. 5, the recess 70 is formed from a series of walls 72 extending inwardly from the rear wall 16, toward the display 14 and front of the mobile device 10. The recess 70 can be sized to form an interference fit with the folded input board 30, for example, so that friction will retain the input board 30 within the recess 70 in the stored position. The recess 70 can be sized so that a depth of the recess is greater than or equal to a total thickness of the input board 30 in the folded position. Accordingly, when the input board 30 is in the folded and stowed position, the input board 30 is entirely received within the recess so that the entire input board is positioned inward from an outermost (e.g., the rear) surface of the rear wall 16. In some examples, a portion of the input board 30 extends approximately flush (e.g., +/−0.25 cm) with the rear wall 16 of the cover so as to provide a smooth, continuous rear surface to the mobile device 10. In some examples, a lip can extend around a portion of a perimeter of the recess 70 to further secure the input board 30 within the recess 70. When the input board 30 is formed of a pliable material, the input board 30 can flex as it contacts the lip. Once beyond the lip, the resilient material of the input board 30 will allow the input board 30 to return to its normal shape, where it can then be stored indefinitely. In still other examples, the input board 30 is removably received within the recess 70 using a magnetic coupling.

In some examples, the recess 70 can house or otherwise include the hinge 64. The hinge 64 can be secured to one of the walls 72 or to the floor 74 of the recess 70. The hinge 64 can extend a portion of the length (e.g., about 70%-90%) of the mobile device 10, which corresponds to the length of the recess 70. In some examples, the hinge 64 is defined by a thickness that corresponds to approximately the thickness of the input board 30 in the folded position. As discussed above, the hinge 64 defines an axis of rotation for the input board 30 to rotate, relative to the mobile device 10.

The hinge 64 can be arranged to restrict the amount and/or rate of relative motion between the input board 30 and the mobile device 10. In some examples, the hinge 64 includes a pin that forms an interference fit between the input board 30 and the cover 12. The interference fit resists but does not prevent relative motion between the input board 30 and the cover 12, such that without additional actuation (e.g., rotational force), the relative angle between the input board 30 and display 14 of the mobile device 10 will be maintained. In some examples, the hinge 64 is a compound joint, including at least two pins that allow the hinge 64 to rotate about multiple parallel axes. In such examples, a first hinge joint within the hinge 64 can be used to rotate the input board 30 into and out of the recess 70, while the second hinge joint can be used to rotate the first hinge joint and the input board 30 about a second axis that allows the input board 30 to rotate around the mobile device 10. In still other examples, the input board 30 is both axially and rotatably movable using the hinge 64. For example, the input board 30 can translate axially away from the pin of the hinge 64 before rotating relative to the mobile device 10 to a deployed position. Similarly, the input board 30 can be stowed by rotating the input board 30 toward the cover 12, sliding the input board inward, toward the pin of the hinge 70, and then finishing the rotation of the input board 30 about the hinge 64 until the input board is positioned entirely within the recess 70. In some examples, the hinge 64 can include a lock that can secure the hinge 64 in different positions. For example, the lock can be configured to secure the input board within the recess 70 in the stowed position, until an actuator (e.g., a mechanical or electrical actuator) is depressed or otherwise manipulated. Although described with respect to the cover 12, the hinge 64 can also be included within the case 110.

In other embodiments, and as depicted in FIG. 7, the mobile device 10 is received within an accessory case, shown as the case 110. The case 110 generally includes a housing 112 that has a base wall 114 and a perimeter wall 116. The perimeter wall 116 extends away from the base wall. The perimeter wall 116 and the base wall 114 together define a cavity 118 that is sized to receive a mobile device, such as the mobile device 10 or a tablet, for example. In some examples, the base wall 114 and/or the perimeter wall includes a recess that is configured to store a stylus.

The housing 112 is designed to receive and store an input board, like the input board 30. In some examples, a channel 120 is formed within the base wall 114. The channel 120 is defined by two or more walls 122 that extend inward from a first perimeter side of the base wall 114. For example, and as shown in FIG. 7, the channel 120 is defined by four rectangular outer walls 122 and channel floor 124. The rectangular walls 122 extend inward, across the base wall 114 but not entirely through the base wall 114. The rectangular walls 122 and channel floor 124 together define a pocket 126 within the base wall 114 that is separated from the cavity 118. By extending inwardly from one side, but not through the entire base wall 114, the pocket 126 can receive and secure the input board 30 in a way that restricts contaminants from contacting or otherwise damaging the input board 30. Similarly, the input board 30 can be substantially hidden when not in use. In some examples, a depth of the pocket 126 is chosen to be less than a length of the input board 30 in the folded configuration so that a portion of the input board 30 extends outwardly from the case 110 for easy removal. In other examples, the depth of the pocket 126 is chosen to be greater than the length of the input board 30 in the folded configuration so that the entire input board 30 is received within the case 110 when the input board 30 is not in use. The width of the channel 120 is greater than a thickness of the input board 30 so that the input board 30 can be pushed into the pocket 126. The depth of the pocket 126 is greater than a depth of the cavity 118.

The input board 30 is removably received within the pocket 126, and can be selectively electrically coupled to the mobile device 10 and/or a battery onboard the case 110. In some examples, the input board 30 includes an onboard and rechargeable battery that receives electrical power from the battery 22 of the mobile device 10. To transmit electrical power between the battery 22 of the mobile device 10 and the battery of the input board 30, the input board 30 is selectively coupled to the rechargeable battery 22 through terminals 128 that are coupled with the rechargeable battery 22. The terminals 128 can be formed within the pocket 126 (e.g., within the channel floor 124), for example, so that an electrical connection is formed between the input board 30 and the terminals 128 whenever the input board 30 is received within the pocket 126. Accordingly, the input board 30 can be recharged whenever the input board 30 is stored and not in use. In such examples, the input board 30 can be configured to communicate with the mobile device 10 over a wireless frequency (e.g., Bluetooth, etc.) to transmit input-based commands. In still other examples, the pocket 126 is configured to operate as a wireless charger for the input board 30, so that energy is transmitted from the rechargeable battery 22 to the input board 30 for later use. Alternatively, the pocket 126 can be arranged so that whenever the input board 30 is received within the pocket 126, the input board 30 is disconnected from the battery 22.

The battery 22 can be placed in communication with the input board 30 in both the storage position and the deployed position. For example, the case 110 can support a series of externally accessible terminals 130 that extend through one or more of the perimeter wall 116 and/or the base wall 114. The terminals 130 can be in direct electrical communication with the battery 22 through a coupling with the externally accessible terminals 56, for example. Like the externally accessible terminals 56, the terminals 130 can include both power terminals and data terminals that are configured to selectively engage with the data terminals 58 and power terminals 60 of the input board 30. When the terminals 130 are placed into communication with the data terminals 58 and power terminals 60 of the input board 30, the input board 30 is placed in electrical communication with the battery 22 of the mobile device 10, and is configured to transmit signals associated with selected inputs between the mobile device 10 and the input board 30 and electrical power between the battery 22 and the input board 30.

The input board 30 can be deployed from the case 110 in several of the same ways that the input board 30 can be deployed from the cover 12 of the mobile device 10. For example, the input board 30 can be removed from the pocket 126, placed into electrical communication with the terminals 130, and then folded into the deployed position by rotating the panel sections 34, 36, 48, 50 about the different fold lines 42, 40, 52, 54 formed on the input board 30. In the fully deployed position and configuration shown in FIG. 4, the width (e.g., lateral distance) of the input board 30 is at least 1.5 times larger than a length (e.g., the lateral distance when rotated 90 degrees) of the mobile device 10. In some examples, the input board 30 can be pulled out from the pocket 126 by hand. In other examples, a mechanical or electrical actuator can be formed within the case 110 or cover 12 to eject the input board 30. In still other examples, the pocket 126 can be formed within the base wall 114 only, and the input board 30 is hingedly coupled to the case 110 and rotatable between the stowed and deployed positions. Once the desired angle relative to the mobile device 10 is reached, the panel sections 32, 34, 36 of the input board 30 can be unfolded so that the input board 30 is ready for use.

In some examples, the input board 30 can form the rear of the case 110. In such embodiments, the input board 30 can be formed of a rigid, semi-rigid, or flexible and resilient material that can be used to protect the mobile device 10 from damage in the event of a drop or other impact. The input board 30 can be locked into the folded and stowed position using a magnetic or otherwise mechanical lock. The lock can be electronically unlocked by the mobile device 10 or through a release button or snap locking mechanism. When the input board 30 forms the rear of the case 110, the input board 30 can extend along the base wall 114 of the case 110 or can be embedded within a portion of the base wall 114, and the input board 30 extends flush with the case 110 when stowed, and the base wall 114 completely surrounds the input board 30. The input board 30 can be locked to the base wall 114, either within a center of the base wall 114 or to a lip formed within the base wall 114 that surrounds the input board 30. In examples where the input board 30 forms the rear of the case 110, the hinge (e.g., the hinge 64) is secured to the case 110. The input board 30 is deployed by rotating the input board 30 around the stationary hinge and to the front of the mobile device 10, then unfolding the panel sections 32, 34, 36. In other examples, the hinge 64 is coupled directly to the input board 30, and can be locked into place relative to the case 110 once the input board 30 is removed from the case 110 for use. Accordingly, the hinge 64 moves with the input board 30. The case 110 can include a track or channel that receives and constrains the relative motion of the hinge 64 and input board 30 relative to the case 110.

Figure 8:
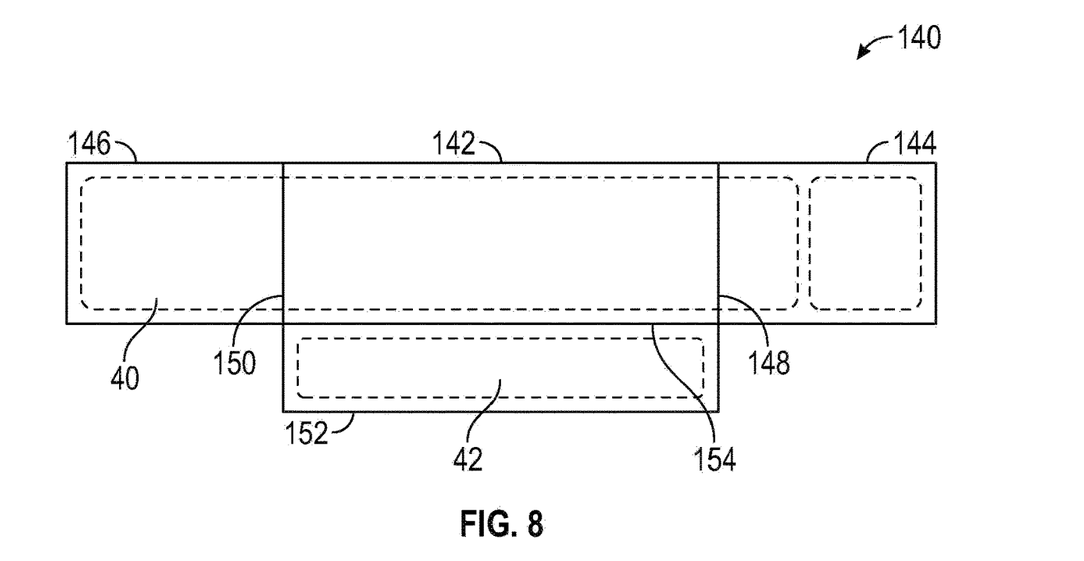
FIG. 8 is a top view of another accessory in a fully unfolded position, depicting another configuration of foldable panel sections.

Referring now to FIG. 8, another exemplary embodiment of an input board 140 is provided. Like the input board 30, the input board 140 is formed of a series of foldable panel sections 142, 144, 146, 152. Like the input board 30, the input board 140 generally includes three panel sections 142, 144, 146 that support a series of alphanumeric keys 40. In some examples, the alphanumeric keys 40 include both a traditional keyboard and a keypad. The alphanumeric keys 40 can extend across one or more of the panel sections 142, 144, 146. The panel sections 144, 146, 152 are hingedly coupled to the first panel section 142 along a series of fold lines 148, 150, 154. As depicted, the fold line 154 extends perpendicular to the fold lines 148, 150.

The input board 140 includes a track pad 42 that extends along the fourth panel section 152. Like the input board 30, the input board 140 can be arranged to fold between a fully deployed position (shown in FIG. 8) and a stowed position where the panel sections 142, 144, 146, 152 are stacked in a folded or hinged assembly. In some examples, there is a dedicated or designed folding order to return the panel sections 142, 144, 146, 152 to the folded and stowed position. In the embodiment depicted in FIG. 8, the panel section 152 is arranged to be folded along a top of the panel sections 144, 146, which in turn are folded onto and extend across the first panel section 142. In some examples, the panel section 152 is narrower than the panel section 142, and the panel section 152 is centered relative to the panel section 142. Alternatively, the panel section 152 can extend along the entire width of the first panel section 142. In some examples, the input board 140 includes magnetic or otherwise mechanical locks that can be used to selectively secure the input board 140 in the folded or stowed position. The panel section 152 can include a variety of other inputs as well, including volume control, brightness control, music controls, and/or numbers, for example.

Using the above described mobile devices 10, cases 110, and input boards 30, 140 significantly more efficient data entry processes can be accomplished. Word processing software and other data entry programs typically reserved to traditional computers and laptops can be included on cell phones, tablets, and other mobile devices, as these software programs will be useful with devices that previously were difficult to quickly or accurately enter significant amounts of data. Additionally, the various input boards 30 described herein are highly portable and easily concealed to protect and transport the input boards 30 for rapid use.

While not specifically shown in the FIGURES, various other modifications to the input board 30 and its deployment mechanisms to promote fast and efficient use. For example, in the storage position or configuration, the input board 30 can face inward (e.g., toward the display 14) or outward (toward the rear of the mobile device 10). The input board 30 can include a swivel joint that allows the input board 30 to first rotate 180 degrees to the opposite orientation before rotating the input board to the deployed position. The hinge 64 can lock or otherwise prohibit rotation of the input board 30 until the orientation of the input board 30 reaches the appropriate direction. In some examples, the input board 30 can be stored in either orientation. As discussed above, the input board 30 can operate using a wired or wireless connection to the mobile device 10. In instances where the input board 30 is hingedly coupled to the mobile device 10 or case 110, a wired coupling can be maintained at all times, regardless of the orientation of the input board 30. Additionally, the deployment of the input board 30 can include rotation and/or translation about multiple axes. For example, the input board 30 may first be urged rearward, out of the recess 70, before it can be rotated about the hinge 64.

Various configurations of the input board 30 are possible as well. Although described as foldable panel segments, the input board 30 can be formed from a series of selectively coupled panel segments. The coupling can be magnetic, for example, which allows for a fast, easy, and consistent assembly process. In some examples, inputs extend across more than one panel section. For example, in some embodiments, the track pad 42 extends on each of the first panel section 32 and the second panel section 34. The different panel sections can be formed of a resilient material that is configured to flex under stress.

In some examples, the mobile device is configured with two software operating interfaces or systems that may adjust the functionality and program availability depending on whether the input board 30 is deployed or stored. When the input board 30 is stored, the mobile device 10 can operate in its limited and normal operating capacity. Once the input board 30 transitions to the deployed position, however, a processor within the mobile device 10 can transition the mobile device to the more robust software operating interface, and additional programs (e.g., word processing programs, spreadsheet programs, etc.) can be unlocked. The two software operating interfaces are configured to communicate with one another through a common master operating system (e.g., Apple iOS, Microsoft, Android, etc.)

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the mobile device accessory as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. An accessory case for a mobile device, comprising:
a housing having a base wall and a perimeter wall extending away from the base wall, the perimeter wall and base wall together defining a cavity to receive a mobile device therein;
a channel formed within the base wall, the channel being defined by a plurality of walls extending inward from a first perimeter side of the base wall or, toward but not through a second perimeter side of the base wall, wherein the channel defines a pocket within the base wall separated from the cavity; and
an input board received within the pocket, the input board being formed by:
a first panel section,
a second panel section connected to the first panel section along a first fold line,
a third panel section connected to the first panel section along a second fold line extending approximately parallel to the first fold line, and
a fourth panel section connected to the first panel section along a third fold line extending approximately perpendicular to the first fold line,
wherein each of the panel sections includes at least one input, wherein the input board is configured to transition between a folded position and an unfolded position, wherein in the folded position, a width of the input board is less than a width of the channel, wherein in the unfolded position, the width of the input board is greater than the width of the channel, and wherein in the folded position, the second panel section and the third panel section extend along a front side of the first panel section and the fourth panel section extends along a back side of the first panel section.

2. The accessory case of claim 1, wherein a depth of the cavity is greater than a width of the pocket, and wherein the input board is defined by a thickness less than the width of the pocket in both the folded position and the unfolded position.

3. The accessory case of claim 1, wherein the input board is selectively electrically coupled to and powered by a battery of the mobile device, wherein when the input board is received within the pocket, the input board is decoupled from the battery of the mobile device.

4. The accessory case of claim 3, wherein an electrical coupling extends from the battery of the mobile device and through at least one of the perimeter wall or the base wall to form an externally accessible coupling that can be selectively contacted by the input board to create an electrical connection between the battery and the input board.

5. The accessory case of claim 1, wherein in the folded position, the second panel section and the third panel section extend along the first panel section.

6. The accessory case of claim 1, wherein a perimeter of the first panel section is approximately twice a perimeter of the second panel section, and wherein in the folded position, the second panel section extends in a plane offset from the first panel section, and wherein in the unfolded position, the second panel section extends coplanar with the first panel section.

7. The accessory case of claim 1, wherein the input board further comprises a fifth panel section, the fifth panel section extending away from the fourth panel section and connected to the fourth panel section along a fourth fold line, the fourth fold line extending parallel to the third fold line, wherein the fourth and fifth panels do not have inputs received thereon.

8. The accessory case of claim 1, wherein the first perimeter side of the base wall is a rear side of the base wall and the second perimeter side of the base wall is a front side of the base wall, and wherein in the folded position, the input board defines at least a portion of an outermost surface of the accessory case, and wherein the input board is hingedly coupled to the base wall.

9. The accessory case of claim 1, wherein the input board includes at least one track pad.

* * * * *